US012659606B2

(12) United States Patent
Ollila

(10) Patent No.: US 12,659,606 B2
(45) Date of Patent: *Jun. 16, 2026

(54) SELECTIVE READING IN COLOUR FILTER ARRAYS HAVING SMALLEST REPEATING UNITS WITH DIFFERENT SUB-UNITS

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 175 days.

This patent is subject to a terminal disclaimer.

(21) Appl. No.: 18/533,406

(22) Filed: Dec. 8, 2023

(65) Prior Publication Data

US 2025/0193542 A1     Jun. 12, 2025

(51) Int. Cl.
| | |
|---|---|
| *H04N 25/13* | (2023.01) |
| *H04N 23/62* | (2023.01) |
| *H04N 25/131* | (2023.01) |
| *H04N 25/133* | (2023.01) |
| *H04N 25/20* | (2023.01) |
| *H04N 25/44* | (2023.01) |
| *H04N 25/441* | (2023.01) |

(Continued)

(52) U.S. Cl.
CPC ........... *H04N 25/135* (2023.01); *H04N 23/62* (2023.01); *H04N 25/131* (2023.01); *H04N 25/133* (2023.01); *H04N 25/20* (2023.01); *H04N 25/44* (2023.01); *H04N 25/441* (2023.01); *H04N 25/443* (2023.01); *H04N 25/445* (2023.01); *H04N 25/78* (2023.01)

(58) Field of Classification Search
CPC .. H04N 25/445; H04N 25/441; H04N 25/443; H04N 25/44; H04N 25/133; H04N 25/20; H04N 25/135
See application file for complete search history.

(56) References Cited

U.S. PATENT DOCUMENTS

| | | | | | |
|---|---|---|---|---|---|
| 6,078,038 | A | * | 6/2000 | Cooper | .................... H04N 5/74 |
| | | | | | 250/234 |
| 6,885,402 | B1 | * | 4/2005 | Misawa | ................. H04N 25/42 |
| | | | | | 348/E3.018 |

(Continued)

FOREIGN PATENT DOCUMENTS

| | | | | | |
|---|---|---|---|---|---|
| AU | 2014277834 | A1 | * | 7/2015 | ........... H04N 25/133 |
| AU | 2014277834 | B2 | * | 7/2016 | ........... H04N 25/133 |

(Continued)

*Primary Examiner* — David N Werner
(74) *Attorney, Agent, or Firm* — Ziegler IP Law Group, LLC.

(57) ABSTRACT

An image sensor with photo-sensitive cells arranged on a photo-sensitive surface; and a colour filter array having smallest repeating units, wherein: a given smallest repeating unit has at least a first sub-unit and a second sub-unit. Image data is read out from the image sensor, wherein when reading out, processor(s) is/are configured to: selectively read out the image data from those photo-sensitive cells in a first region that correspond to respective first sub-units of smallest repeating units in the first region; and selectively skip reading out from those photo-sensitive cells in a second region that correspond to respective first sub-units of at least a first predefined percent of smallest repeating units in the second region; and process the image data to generate image(s).

14 Claims, 5 Drawing Sheets

(51) Int. Cl.
H04N 25/443 (2023.01)
H04N 25/445 (2023.01)
H04N 25/78 (2023.01)

(56) References Cited

U.S. PATENT DOCUMENTS

| | | | | |
|---|---|---|---|---|
| 12,483,804 | B2 * | 11/2025 | Ollila | H04N 25/131 |
| 2002/0139920 | A1 * | 10/2002 | Seibel | A61B 5/0062 |
| | | | | 250/208.1 |
| 2003/0149531 | A1 * | 8/2003 | Hubert | G01N 33/57434 |
| | | | | 702/19 |
| 2004/0027363 | A1 * | 2/2004 | Allen | G09G 3/007 |
| | | | | 345/698 |
| 2004/0028293 | A1 * | 2/2004 | Allen | G09G 3/007 |
| | | | | 382/300 |
| 2011/0037855 | A1 * | 2/2011 | McEwen | H04N 25/48 |
| | | | | 348/E5.09 |
| 2011/0080487 | A1 * | 4/2011 | Venkataraman | H04N 13/239 |
| | | | | 348/E5.024 |
| 2012/0113119 | A1 * | 5/2012 | Massie | H04N 25/48 |
| | | | | 345/428 |
| 2014/0139684 | A1 * | 5/2014 | Binder | H04N 25/48 |
| | | | | 348/164 |
| 2015/0097108 | A1 * | 4/2015 | Bishay | H04N 23/11 |
| | | | | 250/208.1 |
| 2015/0138407 | A1 * | 5/2015 | Kawaguchi | H04N 25/445 |
| | | | | 348/281 |
| 2015/0146067 | A1 * | 5/2015 | Roh | H04N 25/133 |
| | | | | 348/308 |
| 2016/0029000 | A1 * | 1/2016 | Lenz | G02B 21/367 |
| | | | | 348/239 |
| 2018/0122443 | A1 * | 5/2018 | Tanzawa | G11C 5/025 |
| 2020/0358971 | A1 * | 11/2020 | Shim | H10F 39/813 |
| 2022/0180798 | A1 * | 6/2022 | Karivaradaswamy | |
| | | | | H04N 25/131 |
| 2023/0156353 | A1 * | 5/2023 | Jang | G06V 10/761 |
| | | | | 348/302 |
| 2023/0254600 | A1 * | 8/2023 | Aoki | H04N 23/12 |
| | | | | 348/222.1 |
| 2025/0039574 | A1 * | 1/2025 | Ollila | G06T 3/4069 |

FOREIGN PATENT DOCUMENTS

| | | | | | | |
|---|---|---|---|---|---|---|
| CN | 204392456 | U | * | 6/2015 | | |
| EP | 0485092 | A2 | * | 5/1992 | | G03F 7/0007 |
| EP | 0813337 | A2 | * | 12/1997 | | H04N 1/484 |
| EP | 0831340 | A2 | * | 3/1998 | | G02B 5/23 |
| EP | 0981245 | B1 | * | 1/2006 | | H04N 25/00 |
| GB | 2049982 | A | * | 12/1980 | | G02B 27/4205 |
| WO | WO-2016086859 | A1 | * | 6/2016 | | H04N 23/12 |
| WO | WO-2022179686 | A1 | * | 9/2022 | | H04N 25/445 |

* cited by examiner

406a

410a

412a

414a

408a

410a

412a

414a

SELECTIVE READING IN COLOUR FILTER ARRAYS HAVING SMALLEST REPEATING UNITS WITH DIFFERENT SUB-UNITS

TECHNICAL FIELD

The present disclosure relates to imaging systems incorporating selective reading in colour filter arrays (CFAs) having smallest repeating units with different sub-units. The present disclosure also relates to methods incorporating selective reading in CFAs having smallest repeating units with different sub-units.

BACKGROUND

Nowadays, with an increase in the number of images being captured every day, there is an increased demand for developments in image processing. Such a demand is quite high and critical in case of evolving technologies such as immersive extended-reality (XR) technologies which are being employed in various fields such as entertainment, real estate, training, medical imaging operations, simulators, navigation, and the like. Several advancements are being made to develop image generation technology.

However, existing image generation technology has several limitations associated therewith. Firstly, the existing image generation technology processes image signals captured by pixels of an image sensor of a camera in a manner that such processing requires considerable processing resources, involves a long processing time, requires high computing power, and limits a total number of pixels that can be arranged on an image sensor for full pixel readout at a given frame rate. As an example, image signals corresponding to only about 9 million pixels on the image sensor may be processed currently (by full pixel readout) to generate image frames at 90 frames per second (FPS). Secondly, the existing image generation technology are mostly well-suited for accurately generating a gaze region of an image, and often fails to accurately generate a peripheral region of the image, for example, with a low noise. Resultantly, the peripheral region of the image has very high noise that is prominently noticeable (namely, perceivable) to a user, when said image is displayed to the user. This highly adversely affects an overall visual quality of generated images, thereby leading to an unrealistic, non-immersive viewing experience for the user. Thirdly, the existing image processing technology is unable to cope with visual quality requirements, for example, such as a high resolution (such as a resolution higher than or equal to 60 pixels per degree), a small pixel size, and a high frame rate (such as a frame rate higher than or equal to 90 FPS) in some display devices (such as XR devices).

Therefore, in light of the foregoing discussion, there exists a need to overcome the aforementioned drawbacks.

SUMMARY

The present disclosure seeks to provide a system and a method to generate high-quality, realistic images at a high framerate, by processing image data that is read out from a first region and a second region of an image sensor in a selective manner. The aim of the present disclosure is achieved by an imaging system and a method which incorporate selective reading in colour filter arrays having smallest repeating units with different sub-units, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 4A illustrates different regions of a photo-sensitive surface of an image sensor, while

DETAILED DESCRIPTION OF EMBODIMENTS

Figure 1:
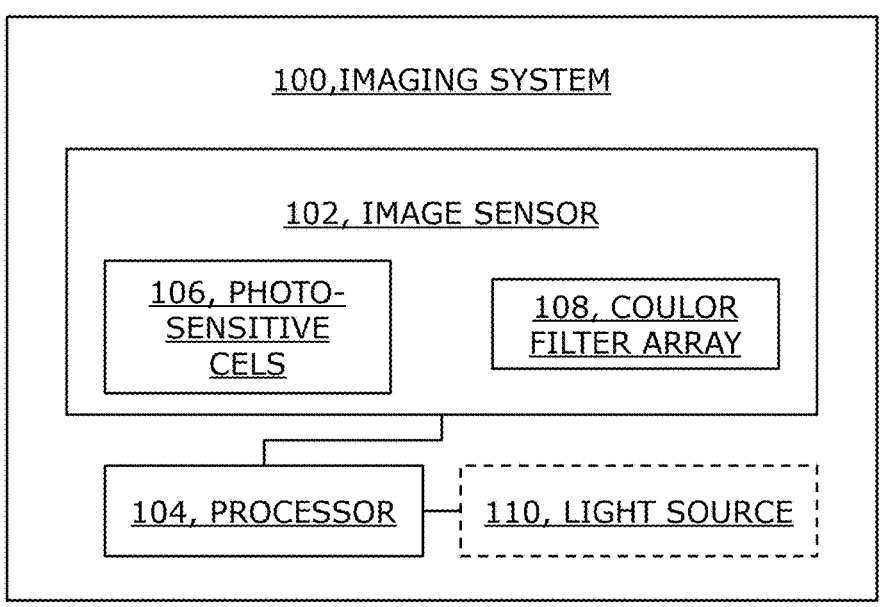
FIG. 1 illustrates a block diagram of an architecture of an imaging system incorporating selective reading in colour filter arrays having smallest repeating units with different sub-units, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:

an image sensor comprising:

a plurality of photo-sensitive cells arranged on a photo-sensitive surface of the image sensor; and a colour filter array comprising a plurality of smallest repeating units, wherein:

a given smallest repeating unit comprises at least a first sub-unit and a second sub-unit, the first sub-unit comprises colour filters of at least three different colours, the second sub-unit comprises at least one other colour filter that allows to pass through at least one of: (i) at least three wavelengths corresponding to respective ones of the at least three different colours, (ii) at least one infrared wavelength; and at least one processor configured to:

read out image data from the image sensor, wherein when reading out, the at least one processor is configured to:

selectively read out the image data from those photo-sensitive cells in a first region of the photo-sensitive surface that correspond to respective first sub-units of smallest repeating units in the first region; and selectively skip reading out from those photo-sensitive cells in a second region of the photo-sensitive surface that correspond to respective first sub-units of at least a first predefined percent of smallest repeating units in the second region; and process the image data to generate at least one image.

In a second aspect, an embodiment of the present disclosure provides a method comprising:

reading out image data from an image sensor, wherein the image sensor comprises a plurality of photo-sensitive cells arranged on a photo-sensitive surface of the image sensor, and a colour filter array comprising a plurality of smallest repeating units, wherein a given smallest repeating unit comprises at least a first sub-unit and a second sub-unit, the first sub-unit comprises colour filters of at least three different colours, the second sub-unit comprises at least one other colour filter that allows to pass through at least one of: (i) at least three wavelengths corresponding to respective ones of the at least three different colours, (ii) at least one infrared wavelength, wherein the step of reading out the image data comprises:

selectively reading out the image data from those photo-sensitive cells in a first region of the photo-sensitive surface that correspond to respective first sub-units of smallest repeating units in the first region; and selectively skipping reading out from those photo-sensitive cells in a second region of the photo-sensitive surface that correspond to respective first sub-units of at least a first predefined percent of smallest repeating units in the second region; and processing the image data to generate at least one image.

The present disclosure provides the aforementioned imaging system and method to generate high-quality, realistic images at a high framerate, by processing the image data that is read out from the first region and the second region of the image sensor in a selective manner. Herein, the colour filter array comprises multiple smallest repeating units, wherein a given smallest repeating unit comprises at least the first sub-unit and the second sub-unit. The image data is read out in a manner that those photo-sensitive cells that correspond to the respective first sub-units in the first region are read out, and those photo-sensitive cells that correspond to at least some of the respective first sub-units in the second region are selectively skipped. Beneficially, upon processing the image data, a high visual quality (for example, in terms of a native resolution, a high contrast, a realistic and accurate colour reproduction, and the like) is achieved in pixels of a region of the at least one image that corresponds to the first region, as well as a low noise is achieved in pixels of a remaining of the at least one image that corresponds to the second region. This considerably improves a viewing experience of a user (for example, in terms of realism and immersiveness), when the at least one image is displayed to the user. Moreover, such a selective read out facilitates in providing a high frame rate of images, and reduces a processing time and processing resources of the at least one processor. This potentially makes the imaging system suitable for use with demanding applications (such as extended-reality applications). The method and the imaging system are simple, robust, fast, reliable, and can be implemented with ease.

Throughout the present disclosure, the term "image sensor" refers to a device that detects light from a real-world environment at the plurality of photo-sensitive cells (namely, a plurality of pixels) to capture a plurality of image signals. The plurality of image signals are electrical signals pertaining to a real-world scene of the real-world environment. The plurality of image signals constitute the image data of the plurality of photo-sensitive cells. Herein, the term "image data" refers to information pertaining to a given photo-sensitive cell of the image sensor, wherein said information comprises one or more of: a colour value of the given photo-sensitive cell, a depth value of the given photo-sensitive cell, a transparency value of the given photo-sensitive cell, an illuminance value (namely, a luminance value or a brightness value) of the given photo-sensitive cell. The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, or similar. Examples of the image sensor include, but are not limited to, a charge-coupled device (CCD) image sensor, and a complementary metal-oxide-semiconductor (CMOS) image sensor. Image sensors are well-known in the art.

It will be appreciated that the plurality of photo-sensitive cells could, for example, be arranged in a rectangular two-dimensional (2D) grid, a polygonal arrangement, a circular arrangement, an elliptical arrangement, a freeform arrangement, or the like, on the image sensor. In an example, the image sensor may comprise 25 megapixels arranged in the rectangular 2D grid (such as a 5000×5000 grid) on the photo-sensitive surface.

Optionally, the image sensor is a part of a camera that is employed to capture image(s). Optionally, the camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the camera is implemented as a depth camera. Examples of the depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. In an example, the camera may be implemented as a combination of the visible-light camera and the depth camera.

Throughout the present disclosure, the term "colour filter array" refers to a pattern of colour filters arranged in front of the plurality of photo-sensitive cells of the photo-sensitive surface, wherein the colour filter array (CFA) allows only specific wavelengths of light to pass through a given colour filter to reach a corresponding photo-sensitive cell of the photo-sensitive surface, for capturing corresponding image data. The CFA is well-known in the art.

Throughout the present disclosure, the term "smallest repeating unit" in the CFA refers to a smallest grid of colour filters that is repeated in the CFA. In other words, the smallest repeating unit may be understood as a building block that gets repeated (for example, horizontally and/or vertically) to form an entirety of the CFA. The given smallest repeating unit may, for example, be an M×N array of colour filters. In an example, for sake of better understanding and clarity, a given portion of the CFA may comprise 12 smallest repeating units arranged in a 3×4 array, wherein a given smallest repeating unit from amongst the 12 smallest repeating units is a 3×2 array of colour filters. In such an example, the CFA would comprise 72 colour filters. Typically, the photo-sensitive surface of the image sensor has millions of photosensitive cells.

Throughout the present disclosure, the term "sub-unit" of the given smallest repeating unit refers to a smaller grid of colour filters within the given smallest repeating unit. Notably, the given smallest repeating unit comprises at least the first sub-unit and the second sub-unit. This means that there could be more than two different sub-units in the given smallest repeating unit i.e., the given smallest repeating unit may also comprise other sub-units, in addition to the first sub-unit and the second sub-unit.

Notably, the first sub-unit comprises the colour filters of the at least three different colours. In some implementations, the colour filters of the at least three different colours comprise at least one blue colour filter, at least one green colour filter, and at least one red colour filter. In such implementations, there could be at least two green colour filters, instead of the at least one green colour filter. Optionally, the colour filters of the at least three different colours the first sub-unit comprises colour filters similar to a Bayer CFA. The Bayer CFA could be one of: a standard Bayer CFA, a 4C Bayer CFA (also referred to as "quad" or "tetra", wherein a group of 2×2 pixels has a same colour filter), a 9C Bayer CFA (also referred to as "nona", wherein a group of 3×3 pixels has a same colour filter), a 16C Bayer CFA (also referred to as "hexadeca", wherein a group of 4×4 pixels has a same colour filter). In other implementations, the colour filters of the at least three different colours comprise at least one cyan colour filter, at least one magenta colour filter, and at least one yellow colour filter. In such implementations, there could be at least two magenta colour filters, instead of the at least one magenta colour filter.

Notably, the second sub-unit comprises the at least one other colour filter. It will be appreciated that the at least one colour filter that allows to pass through the at least three wavelengths corresponding to respective ones of the at least three different colours simultaneously can be understood to be a white colour filter or a near-white colour filter. Furthermore, the at least one colour filter that allows to pass through the at least one infrared wavelength (for example, lying in an infrared wavelength range) can be understood to be an infrared colour filter. It will be appreciated that the second sub-unit does not necessarily have the colour filters of the at least three different colours, similar to that of the first sub-unit.

Optionally, a size of the first sub-unit and a size of the second sub-unit are same. Alternatively, optionally, a size of the first sub-unit and a size of the second sub-unit are different. In an example, the first sub-unit may be a 2×2 array of colour filters having one red colour filter, two green colour filters, and one blue colour filter. On the other hand, the second sub-unit may be a 2×1 array of colour filters having any one of: two white or near-white colour filters, two infrared colour filters, one white or near-white colour filter and one infrared colour filter. Alternatively, the second sub-unit may be a 2×2 array of colour filters having one red colour filter, one green colour filter, one blue colour filter, and one white or near-white colour filter. Yet alternatively, the second sub-unit may be a 2×2 array of colour filters having one red colour filter, one green colour filter, one blue colour filter, and one infrared colour filter. These examples have been also illustrated in conjunction with FIGS. 3A, 3B, 3C, 3D, and 3E, for sake of better understanding and clarity.

In another example, the given smallest repeating unit may comprise a third sub-unit and a fourth sub-unit, in addition to the first sub-unit and the second sub-unit. In this regard, the first sub-unit may be a 2×2 array of colour filters having one red colour filter, two green colour filters, and one blue colour filter. The second sub-unit may be a 2×2 array of colour filters having one red colour filter, one green colour filter, one blue colour filter, and one infrared colour filter. The third sub-unit may be a 2×2 array of colour filters having one cyan colour filter, two magenta colour filters, and one yellow colour filter. The fourth sub-unit may be a 2×2 array of colour filters having one red colour filter, one green colour filter, one blue colour filter, and one white or near-white colour filter. This example have been also illustrated in conjunction with FIG. 3F, for sake of better understanding and clarity.

Notably, the at least one processor controls an overall operation of the imaging system. The at least one processor is communicably coupled to at least the image sensor. Optionally, the at least one processor is implemented as an image signal processor. In an example, the image signal processor may be a programmable digital signal processor (DSP). Alternatively, optionally, the at least one processor is implemented as a cloud server (namely, a remote server) that provides a cloud computing service.

Notably, the image data is selectively read out by the at least one processor from the image sensor. In particular, the at least one processor reads out those photo-sensitive cells that correspond to the respective first sub-units in the first region. Optionally, in this regard, the at least one processor is configured to skip reading out the image data from those photo-sensitive cells that correspond to respective second sub-units of the smallest repeating units in the first region. However, it may also be possible that the at least one processor does not completely skip reading out the image data from those photo-sensitive cells that correspond to the respective second sub-units in the first region, and thus may read out the image data from those photo-sensitive cells that correspond to only some of the respective second sub-units in the first region. In other words, subsampling of the image data is optionally performed for the first region.

Beneficially, a processing time for selectively reading out the image data in the first region is considerably lesser, as compared to a processing time for reading out the image data from each and every photo-sensitive cell in the first region. In addition to this, even reading out (and processing) the image data collected from only those photo-sensitive cells in the first region that correspond to the respective first sub-units, enables in achieving a high visual quality (for example, in terms of a native resolution, a high contrast, a realistic and accurate colour reproduction, and the like) in corresponding pixels of the at least one image (that is generated upon processing the image data). This is because the colour filters of the at least three different colours in the respective first sub-units facilitates in providing better colour reproduction and resolution in the first region. This may particularly be advantageous when the first region is a central region (for example, in case of fixed foveation) or a gaze region (for example, in case of active foveation) in the photo-sensitive surface, as a gaze region of an image should typically have a high colour accuracy, as compared a peripheral region of said image. Moreover, for the first region, reading out and processing the image data corresponding to the white or near-white colour filter and/or infrared colour filter need not necessarily be required, and could be optionally skipped. It will be appreciated that such a selective read out of the image data in the first region also facilitates in providing a high frame rate of images. This has been also illustrated in conjunction with FIG. 4B, for sake of better understanding and clarity.

It will also be appreciated that selectively reading out the image data from those photo-sensitive cells that correspond to the respective first sub-units in the first region does not necessarily mean that all (i.e., 100 percent) of said photo-sensitive cells are read out. Thus, even when reading out is performed only for a predefined percent (such as 95 percent or 99 percent) of said photo-sensitive cells that correspond to the respective first sub-units in the first region, it should be considered as almost a full read out of the image data in the first region. Optionally, when the plurality of photo-sensitive cells are arranged in the rectangular 2D grid on the photo-sensitive surface, the image data is read out in a line-by-line manner.

Further, the at least one processor does not read out those photo-sensitive cells that correspond to the respective first sub-units of at least the first predefined percent of the smallest repeating units in the second region. In other words, the at least one processor skips reading out the image data from those photo-sensitive cells that correspond to at least some of the respective first sub-units in the second region. This means that the image data from those photo-sensitive cells that correspond to remaining first sub-units in the second region could be read out by the at least one processor, unless reading out the image data for an entirety of the respective first sub-units in the second region is skipped. However, since the second sub-unit of the given smallest repeating unit does not necessarily have the colour filters (as discussed earlier), at least some of the first sub-units in the second region are required to be read out for generating colour information in corresponding pixels of the at least one image. In an example implementation, in the second region, only 50 percent of the respective first sub-units are skipped, and a remaining 50 percent of the respective first sub-units are read out. Additionally, optionally, the at least one processor is configured to read out the image data from those photo-sensitive cells in the second region that correspond to respective second sub-units of the smallest repeating units in the second region. However, it may also be possible that the at least one processor may read out the image data from those photo-sensitive cells that correspond to only some of the respective second sub-units in the second region. In other words, subsampling of the image data is preferably performed for the second region. Optionally, the first predefined percent lies in a range of 10 percent to 90 percent of the smallest repeating units in the second region.

Beneficially, a processing time for selectively reading out the image data from the second region is considerably lesser, as compared to a processing time for reading out the image data from each and every photo-sensitive cell in the second region. In addition to this, reading out those photo-sensitive cells in the second region that correspond to the respective second sub-units enables in achieving a low noise in corresponding pixels of the at least one image (that is generated upon processing the image data). This is because the white or near-white colour filters in the second sub-unit allows to reduce noise, as a white pixel receives all the light (without filtering out any particular colour). Moreover, for the second region, due to the presence of the infrared colour filter in the second sub-unit, depth information (such as optical depth values) of pixels representing objects or their parts being imaged by the image sensor can be highly accurately estimated (namely, measured). Thus, this considerably improves a viewing experience of a user (for example, in terms of realism and immersiveness), when the at least one image is displayed to the user. This is because a region of the at least one image that corresponds to the second region would be generated with minimal (i.e., imperceptible) noise, and the user would not perceive any flicker or jerk in said region of the at least one image. This may particularly be advantageous when the second region is a peripheral region in the photo-sensitive surface, the second region surrounds the first region, because the noise is typically more perceivable in a peripheral region of an image, as compared to a gaze region of said image. A selective read out of the image data in the second region may facilitate in providing a high frame rate of images. This has been also illustrated in conjunction with FIG. 4C, for sake of better understanding and clarity.

Upon reading out the image data from the first region and the second region, said image data is processed to generate the at least one image. Optionally, when processing the image data, the at least one processor is configured to perform interpolation and/or demosaicking, and optionally, other image signal processes (for example, in an image signal processing (ISP) pipeline), to generate the at least one image. It will be appreciated that the at least one processor is configured to employ at least one image processing algorithm for performing the interpolation and/or the demosaicking. In this regard, the at least one image processing algorithm is a modified version of image processing algorithms that are well-known in the art for performing the interpolation and/or the demosaicking. The at least one image processing algorithm may also comprise at least one of: an image denoising algorithm, an interpolation algorithm, an image sharpening algorithm, a colour conversion algorithm, an auto white balancing algorithm, a deblurring algorithm, a contrast enhancement algorithm, a low-light enhancement algorithm, a tone mapping algorithm, a super-resolution algorithm, an image compression algorithm. The aforesaid image processing algorithms, the interpolation, and the demosaicking are well-known in the art. Techniques for processing the image data for generating images are well-known in the art.

Optionally, when reading out, the at least one processor is configured to:

selectively skip reading out from those photo-sensitive cells in the first region of the photo-sensitive surface that correspond to respective second sub-units of at least a second predefined percent of the smallest repeating units in the first region; and selectively read out the image data from those photo-sensitive cells in the second region of the photo-sensitive surface that correspond to respective second sub-units of the smallest repeating units in the second region wherein optionally, the second sub-unit further comprises colour filters of the at least three different colours.

In this regard, when selectively skipping reading out from those photo-sensitive cells in the second region that correspond to the respective first sub-units according to the first predefined percent, there may be a scenario when reading out the image data for an entirety of the respective first sub-units in the second region is skipped (i.e., when the first predefined percent is 100 percent). In such a case, when the second sub-unit optionally has the colour filters of the at least three different colours, similar to that of the first sub-unit, the image data from photo-sensitive cells corresponding to the respective first sub-units in the second region need not necessarily required to be read out for generating colour information in corresponding pixels of the at least one image. Therefore, beneficially, the image data from those photo-sensitive cells in the second region that correspond to the respective second sub-units can be read out, and would be sufficient to be processed for generating the colour information in the corresponding pixels of the at least one image. This has been also illustrated in conjunction with FIG. 4E, for sake of better understanding and clarity. However, it may also be possible that the at least one processor does not completely skip reading out the image data from those photo-sensitive cells that correspond to the respective first sub-units in the second region, and thus may read out the image data from those photo-sensitive cells that correspond to only some of the respective first sub-units in the second region.

It will be appreciated that selectively reading out the image data from those photo-sensitive cells that correspond to the respective second sub-units in the second region does not necessarily mean that all (i.e., 100 percent) of said photo-sensitive cells are read out. Thus, even when reading out is performed only for a predefined percent (such as 95 percent or 99 percent) of said photo-sensitive cells that correspond to the respective second sub-units in the second region, it should be considered as almost a full read out of the image data in the second region. It will be appreciated that that when the second sub-unit further comprises colour filters of the at least three different colours, the at least one processor is configured to skip reading out those photo-sensitive cells that correspond to at least one colour from amongst the at least three different colours in the second sub-unit in the second region.

Optionally, the at least one processor skips reading out the image data from those photo-sensitive cells that correspond to at least some of the respective second sub-units in the first region (according to the second predefined percent). This means that the image data from those photo-sensitive cells that correspond to remaining second sub-units in the second region could be read out by the at least one processor, unless reading out the image data for an entirety of the respective second sub-units in the first region is skipped. It will be appreciated that when the image data corresponding to the respective second sub-units in the first region is obtained in a subsampled manner or even when the aforesaid image data is not obtained at all, the image data that is read out from those photo-sensitive cells that correspond to the respective first sub-units in the first region (as discussed earlier) would be sufficient enough (to be processed), for generating highly accurate and realistic colour information in corresponding pixels of the at least one image. In an example implementation, in the first region, an entirety of the respective second sub-units are skipped. In another example implementation, in the first region, only 50 percent of the respective second sub-units are skipped, and a remaining 50 percent of the respective second sub-units are read out. Such an example implementation has been also illustrated in conjunction with FIG. 4D, for sake of better understanding and clarity. Optionally, the second predefined percent lies in a range of 10 percent to 90 percent of the smallest repeating units in the first region.

In an embodiment, the first sub-unit of the given smallest repeating unit is horizontally or vertically adjacent to a first sub-unit of another given smallest repeating unit, and the second sub-unit of the given smallest repeating unit is horizontally or vertically adjacent to a second sub-unit of the another given smallest repeating unit. In this regard, in such an implementation, the plurality of smallest repeating units are arranged sequentially in rows and columns. The technical benefit of arranging the plurality of smallest repeating units in the aforesaid manner is simple, straightforward, easy to implement, may also allow for achieving an acceptably high image quality in the at least one image. Moreover, such an arrangement aligns seamlessly with a typical row and column-wise reading mechanism of an image sensor, an analog-to-digital converter, and other timing-related component involved in image capturing and image processing operations. This implementation has been also illustrated in conjunction with FIG. 5A, for sake of better understanding and clarity.

In an alternative embodiment, the first sub-unit of the given smallest repeating unit is horizontally adjacent to a second sub-unit of another given smallest repeating unit, and the second sub-unit of the given smallest repeating unit is horizontally or vertically adjacent to a first sub-unit of yet another given smallest repeating unit. In this regard, in such an implementation, the plurality of smallest repeating units are arranged in a tiled manner. The technical benefit of arranging the plurality of smallest repeating units in the aforesaid manner allows for achieving an improved image quality of the at least one image, upon processing (i.e., performing the interpolation and the demosaicking on) the image data. This is because with the aforesaid arrangement, gaps between photo-sensitive cells that are read out from the photo-sensitive surface is considerably smaller as compared to gaps between photo-sensitive cells when the plurality of smallest repeating units are arranged sequentially in the rows and the columns (as discussed in the previous embodiment). This implementation has been also illustrated in conjunction with FIG. 5B, for sake of better understanding and clarity.

Optionally, the at least one processor is configured to:
obtain information indicative of a gaze direction of a user; and
determine the first region and the second region in the photo-sensitive surface of the image sensor, based on the gaze direction, wherein the second region surrounds the first region.

Optionally, the at least one processor is configured to obtain, from a client device, the information indicative of the gaze direction. The client device could be implemented, for example, as a head-mounted display (HMD) device. Optionally, the client device comprises gaze-tracking means. The term "gaze direction" refers to a direction in which a given eye of the user is gazing. Such a gaze direction may be a gaze direction of a single user of a client device, or be an average gaze direction for multiple users of different client devices. The gaze direction may be represented by a gaze vector. Furthermore, the term "gaze-tracking means" refers to specialized equipment for detecting and/or following gaze of user's eyes. The gaze-tracking means could be implemented as contact lenses with sensors, cameras monitoring a position, a size and/or a shape of a pupil of the user's eye, and the like. The gaze-tracking means are well-known in the art. The term "head-mounted display" device refers to specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses augmented reality (AR), mixed reality (MR), and the like. It will be appreciated that when the imaging system is remotely located from the client device, the at least one processor obtains the information indicative of the gaze direction from the client device. Alternatively, when the imaging system is integrated into the client device, the at least one processor obtains the information indicative of the gaze direction from the gaze-tracking means of the client device.

Optionally, the gaze direction is a current gaze direction. Alternatively, optionally, the gaze direction is a predicted gaze direction. It will be appreciated that optionally the predicted gaze direction is predicted, based on a change in user's gaze, wherein the predicted gaze direction lies along a direction of the change in the user's gaze. In such a case, the change in the user's gaze could be determined in terms of a gaze velocity and/or a gaze acceleration of the given eye, using information indicative of previous gaze directions of the given eye and/or the current gaze direction of the given eye. Yet alternatively, optionally, the gaze direction is a default gaze direction, wherein the default gaze direction is straight towards a centre of a field of view of the image sensor. In this regard, it is considered that the gaze of the user's eye is, by default, typically directed towards a centre of his/her field of view. In such a case, a central region of a field of view of the user is resolved to a much greater degree of visual detail, as compared to a remaining, peripheral region of the field of view of the user. It is to be understood that a gaze position corresponding to the default gaze direction lies at a centre of the photosensitive surface.

Optionally, when determining the first region and the second region in the photo-sensitive surface, the at least one processor is configured to map the gaze direction of the given eye onto the photo-sensitive surface. In this regard, the first region is understood to be a gaze region, which refers to a region in the photo-sensitive surface onto which the gaze direction is mapped. The gaze region may, for example, be a central region of the photo-sensitive surface, a top-left region of the photo-sensitive surface, a bottom-right region of the photo-sensitive surface, or similar. Further, the second region is understood to be a peripheral region, which refers to another region in the photo-sensitive surface that surrounds the gaze region. The another region may, for example, remain after excluding the gaze region from the photo-sensitive surface.

In this way, the first region and the second region are optionally determined dynamically, based on the gaze direction. Such a dynamic manner of selecting the first region and the second region beneficially emulates a way in which the user actively focuses within his/her field of view. Alternatively, in fixed-foveation implementations, the first region in the photo-sensitive surface is determined in a fixed manner, according to a centre of the photo-sensitive surface. In this regard, the gaze direction is assumed to be directed along an optical axis of the camera (i.e., directed straight towards a centre of the at least one image). Therefore, the at least one processor is configured to determine the first region at the centre of the photo-sensitive surface. This is because the user's gaze is generally directed towards a centre of his/her field of view. When the user wants to view object(s) in a periphery of his/her field of view, the user typically turns his/her head in a manner that said object(s) lie at a centre of his/her current field of view. In such a case, a central portion of the user's field of view is resolved to a much greater degree of visual detail by the fovea of the user's eye, as compared to a peripheral portion of the user's field of view. The aforesaid fixed manner of determining the first region beneficially emulates a way in which users generally focus within their fields of view. As a result, better colour reproduction is obtained for pixels of a region of the at least one image that corresponds to the first region, and minimal flicker (due to reduced noise) is obtained for pixels of a region of the at least one image that corresponds to the second region.

Optionally, an angular width of the second region lies in a range of 12.5-50 degrees from a gaze position to 45-110 degrees from the gaze position, while an angular extent of the first region lies in a range of 0 degree from the gaze position to 2-50 degrees from the gaze position, wherein the gaze position is a position on the photo-sensitive surface onto which the gaze direction is mapped. Optionally, the at least one processor is further configured to determine an intermediate region in the photo-sensitive surface, based on the gaze direction, wherein the intermediate region lies in between the first region and the second region in the photo-sensitive surface. Optionally, a width of the intermediate region lies in a range of 1 pixel to 300 pixels.

It will be appreciated that there may be an instance when a difference between a visual quality of a gaze-continent region of the at least one image (that corresponds to the first region in the photo-sensitive surface) and a visual quality of a peripheral region of the at least one image (that corresponds to the second region in the photo-sensitive surface) is considerably drastic (namely, too abrupt). Thus, in such instances, a transition (namely, a boundary) between the two aforesaid regions of the at least one image may be clearly recognizable (namely, perceivable) by the user when the at least one image is displayed to the user. This may disrupt a viewing experience of the user. Therefore, in order to circumvent this potential problem, the intermediate region in the photo-sensitive surface is optionally determined (as discussed hereinabove), and reading out the image data from said intermediate region in the photo-sensitive surface could be performed as a mix of both how the image data is read out from the first region and the second region in the photo-sensitive surface.

Optionally, the imaging system further comprises a structured light source, wherein the at least one other colour filter in the second sub-unit allows the at least one infrared wavelength to pass through, and wherein the at least one image comprises a visible-light image and a depth image. In this regard, when the at least one other colour filter in the second sub-unit is implemented as the infrared colour filter, the structured light source is optionally employed to project structured light patterns in the real-world environment (that is being imaged using the image sensor). Such structured light patterns could be binary-coded structured light patterns, grey-coded structured light patterns, colour-coded structured light patterns, or similar. Optionally, the at least one processor is configured to control the structured light source to illuminate the real-world environment. The technical benefit of employing the structured light source is that it facilitates in generating accurate and precise depth information with a minimal projection time (namely, a scanning time). The structured light patterns could be spatially-variable light patterns (wherein a density of light spots varies spatially across a given structured light pattern). The structured light source is well-known in the art.

It will be appreciated that a manner in which the structured light patterns deforms upon striking surfaces of objects (or their portions) present in the real-world environment allows for determining optical depths of points on said surfaces with respect to the structured light source being arranged, for example, a same device where the image sensor is also arranged. The structured light patterns are deformed according to shapes of the surfaces, which could be cylindrical, spherical, conical, polygonal, freeform shape, and the like. The aforesaid deformation may also depend on a surface geometry of a given surface and/or a surface texture of the given surface. The surface geometry of the given surface could be planar (namely, flat), curved, free-form, or similar. Optionally, reflections of the structured light patterns are sensed by photo-sensitive cells of the image sensor having respective infrared colour filters, and then these reflections are processed to obtain the depth image. The depth image may be indicative of the shapes of the surfaces and the optical depths of the points on the surfaces. The shapes and the optical depths could be also determined using a triangulation technique.

It will be appreciated that the visible-light image is a visual representation of the real-world environment. The term "visual representation" encompasses colour information represented in the visible-light image, and additionally optionally, other attributes associated with the visible-light image (for example, such as depth information, illuminance information, transparency information, and the like). Optionally, the depth image is in a form of a depth map. The term "depth map" refers to a data structure comprising information pertaining to the optical depths of the objects or their portions present in the real-world environment. The depth map could be an image comprising a plurality of pixels, wherein a pixel value of each pixel indicates an optical depth of its corresponding real point within the real-world environment.

Optionally, the at least one other colour filter in the second sub-unit allows the at least three wavelengths corresponding to the respective ones of the at least three different colours to pass through, and wherein the at least one processor is configured to:

detect when a given criteria is satisfied, wherein the given criteria is satisfied when at least one of the following is true:

(i) an average illuminance of a real-world environment is lower than a predefined threshold illuminance;

(ii) a signal-to-noise ratio of the image data is lower than a predefined threshold value;

when it is detected that the given criteria is satisfied, read out another image data from the image sensor, wherein when reading out the another image data, the at least one processor is configured to:

selectively read out the another image data from those photo-sensitive cells that correspond to respective second sub-units of the plurality of smallest repeating units; and selectively skip reading out from those photo-sensitive cells that correspond to respective first sub-units of at least a third predefined percent of the plurality of smallest repeating units; and process the another image data to generate at least one another image.

In this regard, when the at least one other colour filter in the second sub-unit is implemented as the white or near-white colour filter, an environmental condition of the real-world environment (whereat the image sensor is present) and/or a noise level in the image data collected by the image sensor is/are determined, in order to read out the another image data from the image sensor in the aforesaid manner. Optionally, the at least one processor is configured to determine the average illuminance of the real-world environment by employing at least one ambient light sensor from a given pose. Typically, ambient light sensors are designed to measure an amount of light present in their surroundings.

The ambient light sensors are well-known in the art. Alternatively, optionally, the at least one processor is configured to determine the average illuminance of the real-world environment by calculating an average of illuminance values of pixels in at least one previous image that is captured using the image sensor. The term "average illuminance" of the real-world environment refers to an average amount of light intensity per unit area in the real-world environment. In other words, the average illuminance is an average brightness level across an area within the real-world environment, taking into account variations in light intensities across said area. It will be appreciated that the predefined threshold illuminance refers to a minimum allowable illuminance of the real-world environment, below which the environment conditions of the real-world environment are be considered to be low-light/dark environment conditions. Optionally, the predefined threshold illuminance lies in a range of 50 lux (namely, lumens per square meter) to 1500 lux.

Furthermore, optionally, the at least one processor is configured to determine the signal-to-noise ratio of the image data by taking into account at least one of: illuminance values of pixels in at least one previous image that is captured using the image sensor, a quality of optics (for example, such as lens, mirrors, and the like) used in the camera, an exposure time of the image sensor, a sensitivity of the image sensor, an aperture size of the image sensor, a gain condition, optical aberrations, an operating temperature of the image sensor. In an example, the signal-to-noise ratio of the image data could be determined using a pre-defined correlation between the signal-to-noise ratio and at least one of the aforementioned factors. Typically, the signal-to-noise ratio of the image data is a direct measure of image quality of an image that is generated upon processing said image data. The signal-to-noise ratio is useful in ascertaining a balance between useful signal, which is the image data, and an unwanted noise that can degrade said image. It will be appreciated that the predefined threshold value refers to a minimum allowable signal-to-noise ratio of the image data, below which the image data is considered to be significantly noisy. Optionally, the predefined threshold value is 45 decibels.

Once it is detected that the given criteria is satisfied i.e., when the environment conditions of the real-world environment are detected to be low-light/dark environment conditions and/or when the image data is detected to be significantly noisy, the another image data is read out from the image sensor. In this regard, irrespective of any particular region in the photo-sensitive surface, the at least one processor reads out the another image data from those photo-sensitive cells that correspond to the respective second sub-units (i.e., almost all second sub-units) in both the first region and the second region (namely, for an entirety of the image sensor). Beneficially, this ensures that the another image data would comprise considerable illuminance (namely, brightness) information of said photo-sensitive cells, in order to generate the at least one another image (that is generated upon processing the image data) realistically and accurately even in the low-light/dark environment conditions. In addition to this, this also facilitates in achieving a low noise in almost all pixels of the at least one another image. This is because the white or near-white colour filters in the respective second sub-units allows to reduce noise, thereby improving a signal-to-noise ratio of the another image data.

Furthermore, optionally, the at least one processor is configured to skip reading out from those photo-sensitive cells that correspond to at least some of the respective first sub-units in the first region and from those photo-sensitive cells that correspond to at least some of the respective first sub-units in the second region, according to the third pre-defined percent. It will be appreciated that when the image data corresponding to the respective first sub-units in the first region and the second region is obtained in a sub-sampled manner, said image data would be sufficient (to be processed), for generating highly accurate and realistic colour information in corresponding pixels of the at least one another image. In an example implementation, in both the first region and the second region, only 50 percent of the respective first sub-units are skipped, and a remaining 50 percent of the respective first sub-units are read out. Option-ally, the third predefined percent lies in a range of 10 percent to 90 percent of the plurality of smallest repeating units. It will be appreciated that the another image data is processed in a similar manner as described earlier with respect to the image data corresponding to the at least one image, for generating the at least one another image.

Optionally, when reading out the image data from photo-sensitive cells in at least one of: the first region, the second region, of the photo-sensitive surface, the at least one processor is configured to employ a subsampling pattern. The term "subsampling pattern" refers to a software-based masking pattern that enables in selectively reading out photo-sensitive cells from (a given region of the photo-sensitive surface) of the image sensor. In this regard, photo-sensitive cells whose locations are indicated in the subsam-pling pattern as skipped are not read out from the image sensor (and thus image data for such photo-sensitive cells is not obtained), while photo-sensitive cells whose locations are indicated in the subsampling pattern as not skipped are read out from the image sensor (and thus image data for such photo-sensitive cells is obtained). The subsampling pattern could be different for generating different regions of a same image, i.e., a subsampling pattern employed for the first region could be different from a subsampling pattern employed for the second region. Optionally, the subsam-pling pattern is a bit mask. As an example, in the subsam-pling pattern, '0' could indicate a photo-sensitive cell to be skipped and '1' could indicate a photo-sensitive cell to be read out. It will be appreciated that the subsampling pattern could be a non-regular pattern, wherein the non-regular pattern is a software-based masking pattern which indicates locations of irregularly-arranged (i.e., disorderly arranged) pixels in the image sensor that are to be read out. The subsampling pattern could alternatively be a random pattern, a gradient-type pattern, or a regular pattern. It will also be appreciated that the aforesaid subsampling could either be performed during reading out from the image sensor or be performed prior to conversion of RAW image data into a given colour space format (for example, such as an RGB format, a Luminance and two-colour differences (YUV) format, or the like) in the ISP pipeline. Both of the aforesaid ways of subsampling are well-known in the art.

The present disclosure also relates to the method as described above. Various embodiments and variants dis-closed above, with respect to the aforementioned the imag-ing system, apply mutatis mutandis to the method.

In an embodiment, the step of reading out comprises:
   selectively skipping reading out from those photo-sensi-tive cells in the first region of the photo-sensitive surface that correspond to respective second sub-units of at least a second predefined percent of the smallest repeating units in the first region; and
   selectively reading out the image data from those photo-sensitive cells in the second region of the photosensitive surface that correspond to respective second sub-units of the smallest repeating units in the second region
wherein optionally, the second sub-unit further comprises colour filters of the at least three different colours.
   Optionally, the method further comprises:
   obtaining information indicative of a gaze direction of a user; and
   determining the first region and the second region in the photo-sensitive surface of the image sensor, based on the gaze direction, wherein the second region surrounds the first region.

In an embodiment, the at least one other colour filter in the second sub-unit allows the at least one infrared wavelength to pass through, and wherein the method further comprises illuminating a real-world environment using a structured light source, wherein the at least one image comprises a visible-light image and a depth image.

In an alternative embodiment, the at least one other colour filter in the second sub-unit allows the at least three wave-lengths corresponding to the respective ones of the at least three different colours to pass through, and wherein the method further comprises:
   detecting when a given criteria is satisfied, wherein the given criteria is satisfied when at least one of the following is true:
      (i) an average illuminance of a real-world environment is lower than a predefined threshold illuminance;
      (ii) a signal-to-noise ratio of the image data is lower than a predefined threshold value;
   when it is detected that the given criteria is satisfied, reading out another image data from the image sensor, wherein the step of reading out the another image data comprises:
   selectively reading out the another image data from those photo-sensitive cells that correspond to respec-tive second sub-units of the plurality of smallest repeating units; and
   selectively skipping reading out from those photo-sensitive cells that correspond to respective first sub-units of at least a third predefined percent of the plurality of smallest repeating units; and
   processing the another image data to generate at least one another image.

In an embodiment, in the method, wherein the first sub-unit of the given smallest repeating unit is horizontally or vertically adjacent to a first sub-unit of another given smallest repeating unit, and the second sub-unit of the given smallest repeating unit is horizontally or vertically adjacent to a second sub-unit of the another given smallest repeating unit.

In an embodiment, in the method, wherein the first sub-unit of the given smallest repeating unit is horizontally adjacent to a second sub-unit of another given smallest repeating unit, and the second sub-unit of the given smallest repeating unit is horizontally or vertically adjacent to a first sub-unit of yet another given smallest repeating unit.

DETAILED DESCRIPTION OF THE DRAWINGS

Referring to FIG. 1, illustrated is a block diagram of an architecture of an imaging system 100 incorporating selec-tive reading in colour filter arrays having smallest repeating units with different sub-units, in accordance with an embodi-ment of the present disclosure. The imaging system 100 comprises an image sensor 102 and at least one processor (for example, depicted as a processor 104). The image sensor 102 comprises a plurality of photo-sensitive cells 106 and a colour filter array 108. The processor 104 is communicably coupled to the image sensor 102. Optionally, the imaging system 100 further comprises a structured light source 110, that is communicably coupled to the processor 104. The processor 104 is configured to perform various operations, as described earlier with respect to the aforementioned first aspect.

It may be understood by a person skilled in the art that FIG. 1 includes a simplified architecture of the imaging system 100, for sake of clarity, which should not unduly limit the scope of the claims herein. It is to be understood that the specific implementation of the imaging system 100 is provided as an example and is not to be construed as limiting it to specific numbers or types of image sensors, processors, photo-sensitive cells, structured light sources, and colour filter arrays. The person skilled in the art will recognize many variations, alternatives, and modifications of embodiments of the present disclosure.

Figure 2:
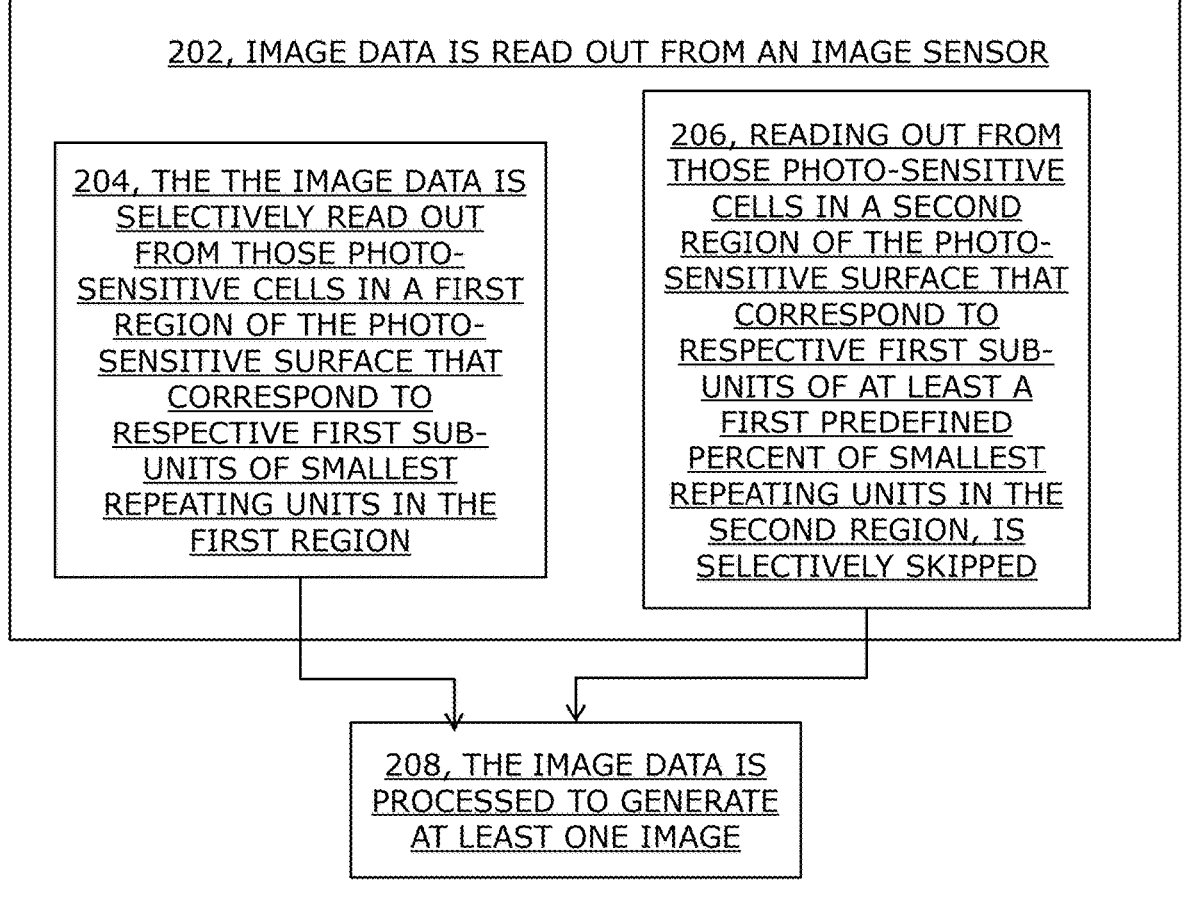
FIG. 2 illustrates steps of a method incorporating selective reading in colour filter arrays having smallest repeating units with different sub-units, in accordance with an embodiment of the present disclosure.

Referring to FIG. 2, illustrated are steps of a method incorporating selective reading in colour filter arrays having smallest repeating units with different sub-units, in accordance with an embodiment of the present disclosure. At step 202, image data is read out from an image sensor. The image sensor comprises: a plurality of photo-sensitive cells arranged on a photo-sensitive surface of the image sensor; and a colour filter array comprising a plurality of smallest repeating units, wherein: a given smallest repeating unit comprises at least a first sub-unit and a second sub-unit, the first sub-unit comprises colour filters of at least three different colours, the second sub-unit comprises at least one other colour filter that allows to pass through at least one of: (i) at least three wavelengths corresponding to respective ones of the at least three different colours, (ii) at least one infrared wavelength. Step 202 comprises steps 204 and 206. In this regard, at step 204, the image data is selectively read out from those photo-sensitive cells in a first region of the photo-sensitive surface that correspond to respective first sub-units of smallest repeating units in the first region. Simultaneously, at step 206, reading out from those photo-sensitive cells in a second region of the photo-sensitive surface that correspond to respective first sub-units of at least a first predefined percent of smallest repeating units in the second region, is selectively skipped. At step 208, the image data is processed to generate at least one image.

The aforementioned steps are only illustrative and other alternatives can also be provided where one or more steps are added, one or more steps are removed, or one or more steps are provided in a different sequence without departing from the scope of the claims.

Referring to FIGS. 3A, 3B, 3C, 3D, 3E, and 3F illustrated are different examples of a smallest repeating unit 302a, 302b, 302c, 302d, 302e, and 302f of a colour filter array, in accordance with an embodiment of the present disclosure. With reference to FIGS. 3A-3F, "B" refers to a blue colour filter, "G" refers to a green colour filter, "R" refers to a red colour filter, "W" refers to a white or near-white colour filter, and "I" refers to an infrared colour filter. It will be appreciated that the white or near-white colour filter allows to pass through at least three wavelengths corresponding to respective ones of at least a green colour, a red colour, and a blue colour, simultaneously. Moreover, the infrared colour filter allows to pass through at least one infrared wavelength. It will also be appreciated that in some implementations, a cyan colour filter, a magenta colour filter, and a yellow colour filter could also be employed instead of employing the blue colour filter, the green colour filter, and the red colour filter, respectively.

Figures 3A, 3B, 3C:
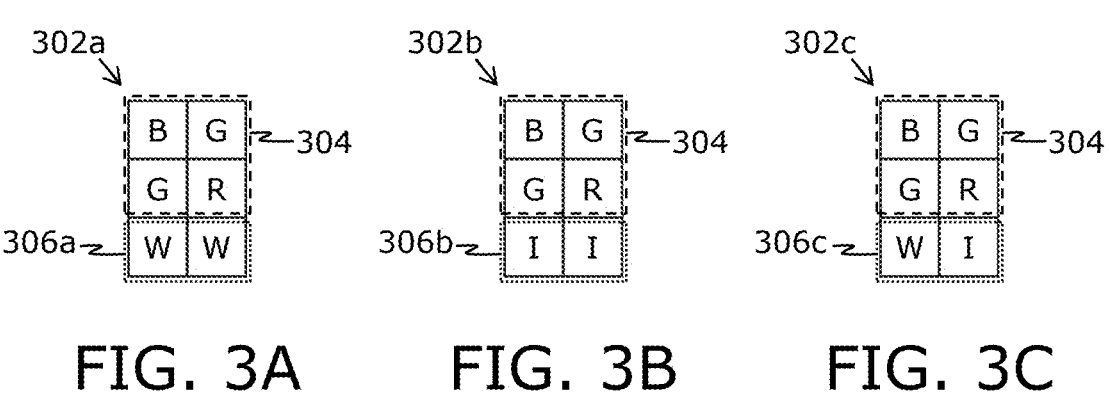
FIGS. 3A, 3B, 3C, 3D, 3E, and 3F illustrate different examples of a smallest repeating unit of a colour filter array, in accordance with an embodiment of the present disclosure.

With reference to FIGS. 3A, 3B, and 3C, the smallest repeating units 302a, 302b, and 302c are represented as 2×3 arrays of colour filters, respectively. The smallest repeating units 302a, 302b, and 302c comprise a first sub-unit 304 (depicted as a 2×2 array of colour filters, using a dashed line box), wherein the first sub-unit 304 comprises two green colour filters, one red colour filter, and one blue colour filter. The smallest repeating units 302a, 302b, and 302c comprise second sub-units 306a, 306b, and 306c (depicted as 2×1 arrays of colour filters, using dotted line boxes), respectively. With reference to FIG. 3A, the second sub-unit 306a comprises two white or near-white colour filters. With reference to FIG. 3B, the second sub-unit 306b comprises two infrared colour filters. With reference to FIG. 3C, the second sub-unit 306c comprises one white or near-white colour filter and one infrared colour filter.

Figures 3D, 3E, 3F:
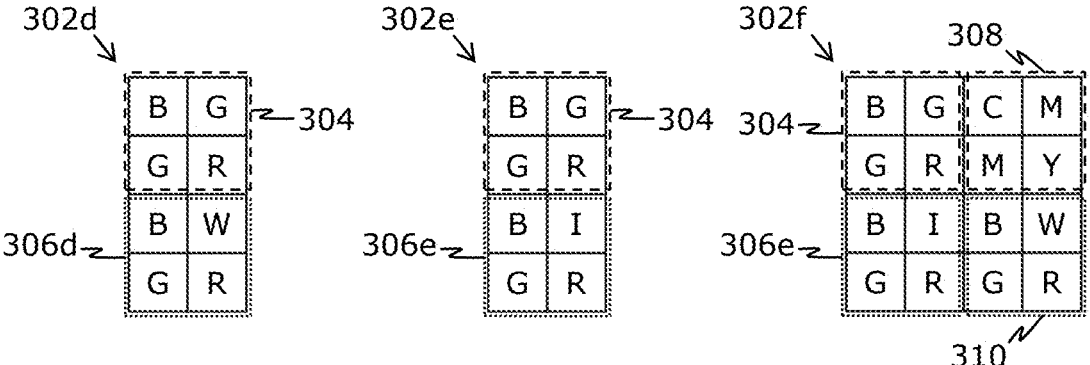

With reference to FIGS. 3D and 3E, the smallest repeating units 302d and 302e are represented as 2×4 arrays of colour filters, respectively. The smallest repeating units 302d and 302e comprise the first sub-unit 304 (exactly same as described hereinabove). The smallest repeating units 302d and 302e comprise second sub-units 306d and 306e (depicted as 2×2 arrays of colour filters, using dotted line boxes), respectively. With reference to FIG. 3D, the second sub-unit 306d comprises one blue colour filter, one green colour filter, one red colour filter, and one white or near-white colour filter. With reference to FIG. 3E, the second sub-unit 306e comprises one blue colour filter, one green colour filter, one red colour filter, and one infrared colour filter.

With reference to FIG. 3F, the smallest repeating unit 302f is represented as a 4×4 array of colour filters. The smallest repeating unit 302f comprises the first sub-unit 304 and the second sub-unit 306e (exactly same as described above). The smallest repeating unit 302f further comprises a third sub-unit 308 (depicted as a 2×2 array of colour filters) and a fourth sub-unit 310 (depicted as a 2×2 array of colour filters). The third sub-unit 308 comprises one cyan colour filter (depicted using a letter "C"), two magenta colour filters (depicted using a letter "M"), and one yellow colour filter (depicted using a letter "Y"). The fourth sub-unit 310 comprises one red colour filter, one green colour filter, one blue colour filter, and one white or near-white colour filter.

FIGS. 3A-3F are merely examples, which should not unduly limit the scope of the claims herein. The person skilled in the art will recognize many variations, alternatives, and modifications of embodiments of the present disclosure. For example, the second sub-unit 306e could alternatively be a 2×3 array of colour filters, comprising one white or near-white colour filter, one blue colour filter, two green colour filters, one red colour filter, and one infrared colour filter. Similarly, any first sub-unit could also be a 3×3 array of colour filters, a 3×4 array of colour filters, a 4×4 array of colour filters, or similar.

Figure 4A:
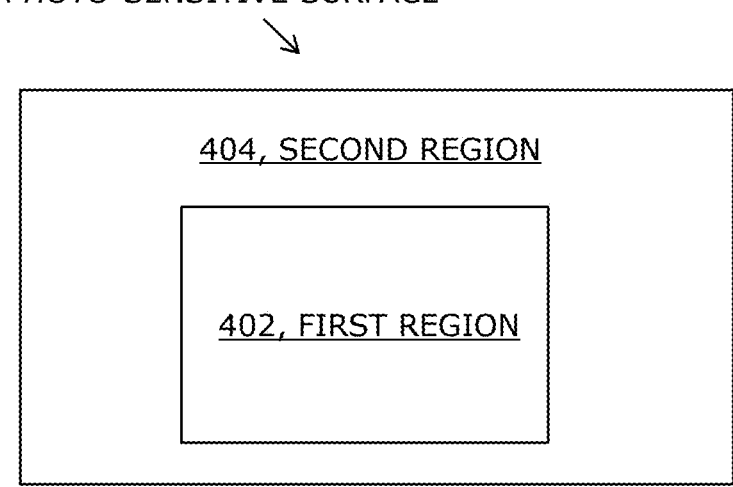

Referring to FIGS. 4A, 4B, 4C, 4D, and 4E, FIG. 4A illustrates different regions of a photo-sensitive surface 400 of an image sensor, while FIGS. 4B, 4C, 4D, and 4E illustrate exemplary ways of reading out image data from the different regions of the photo-sensitive surface 400 of the image sensor, in accordance with different embodiments of the present disclosure. With reference to FIG. 4A, the photo-sensitive surface 400 of the image sensor comprises a first region 402 and a second region 404, wherein the second region 404 surrounds the first region 402. The first region

402 and the second region 404 are determined (by at least one processor), based on a gaze direction of a user (for example, at a centre of the photo-sensitive surface 400). Thus, the first region 402 and the second region 404 is to be understood to be a gaze region and a peripheral region in the photo-sensitive surface 400, respectively.

With reference to FIGS. 4B-4E, "B" refers to a blue colour filter, "G" refers to a green colour filter, "R" refers to a red colour filter, "W" refers to a white or near-white colour filter, and "I" refers to an infrared colour filter. It will be appreciated that the white or near-white colour filter allows to pass through at least three wavelengths corresponding to respective ones of at least a green colour, a red colour, and a blue colour, simultaneously. Moreover, the infrared colour filter allows to pass through at least one infrared wavelength. It will also be appreciated that in some implementations, a cyan colour filter, a magenta colour filter, and a yellow colour filter could also be employed instead of employing the blue colour filter, the green colour filter, and the red colour filter, respectively.

Figure 4B:
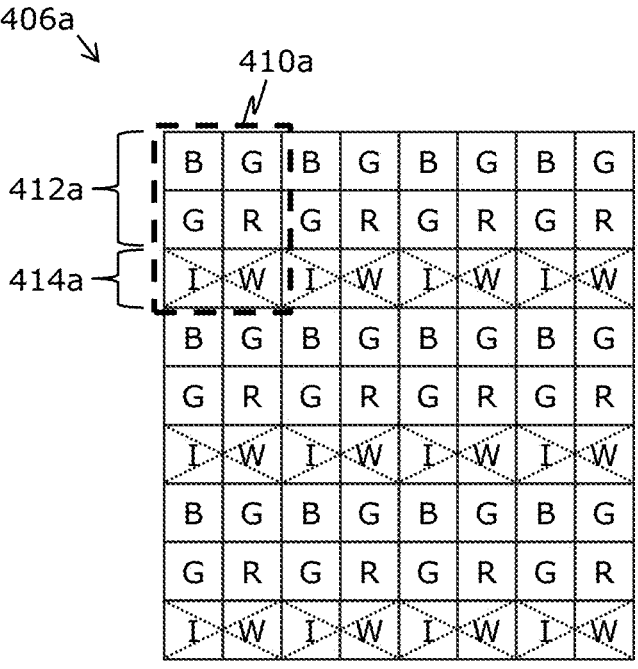
FIGS. 4B, 4C, 4D, and 4E illustrate exemplary ways of reading out image data from the different regions of the photo-sensitive surface of the image sensor, in accordance with different embodiments of the present disclosure.
Figure 4C:
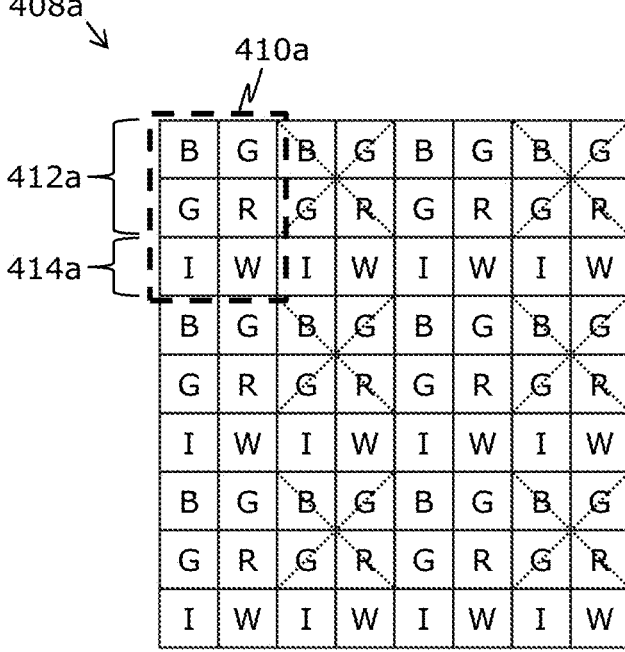

With reference to FIGS. 4B and 4C, there is shown how the image data is read out from a portion 406a of the first region 402, and from a portion 408a of the second region 404, in accordance with one embodiment of the present disclosure. For sake of simplicity and clarity, a given portion of a given region is shown to comprise 72 photosensitive cells arranged in a 9×8 grid. The term "given portion" encompasses the portion 406a and the portion 408a, and the term "given region" encompasses the first region 402 and the second region 404. It will be appreciated that a photo-sensitive surface of a typical image sensor has millions of photosensitive cells (namely, pixels).

With reference to FIGS. 4B and 4C, the image sensor comprises a colour filter array (CFA) arranged in front of photosensitive cells of the photosensitive surface 400. As shown, the CFA comprises 12 smallest repeating units (for example, in form of a 4×3 array), wherein a given smallest repeating unit 410a (depicted as a 2×3 array of colour filters, using a dashed line box) comprises a first sub-unit 412a (depicted as a 2×2 array of colour filters) and a second sub-unit 414a (depicted as a 2×1 array of colour filters). The first sub-unit 412a comprises two green colour filters, one red colour filter, and one blue colour filter. The second sub-unit 414a comprises one white or near-white colour filter and one infrared colour filter.

With reference to FIG. 4B, out of 72 photo-sensitive cells, image data from 48 photo-sensitive cells that correspond to respective first sub-units of the 12 smallest repeating units in the portion 406a of the first region 402 is read out. More-over, image data from all remaining 24 photo-sensitive cells (crossed out as dotted 'X's) that correspond to respective second sub-units of the 12 smallest repeating units in the portion 406a is not read out (namely, skipped).

With reference to FIG. 4C, out of 72 photo-sensitive cells, image data from 24 photo-sensitive cells (crossed out as dotted 'X's) that correspond to respective first sub-units of 6 smallest repeating units (i.e., 50 percent of the 12 smallest repeating units) in the portion 408a of the second region 404 is not read out. In such a case, image data from 24 photo-sensitive cells that correspond to respective first sub-units of remaining 6 smallest repeating units in the portion 408a is read out. Moreover, image data from all 24 photo-sensitive cells that correspond to respective second sub-units of the 12 smallest repeating units in the portion 408a is also read out.

Figure 4D:
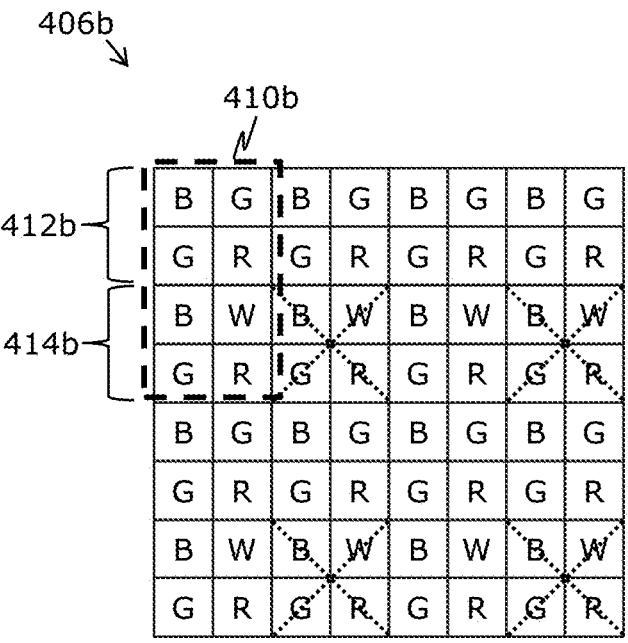
Figure 4E:
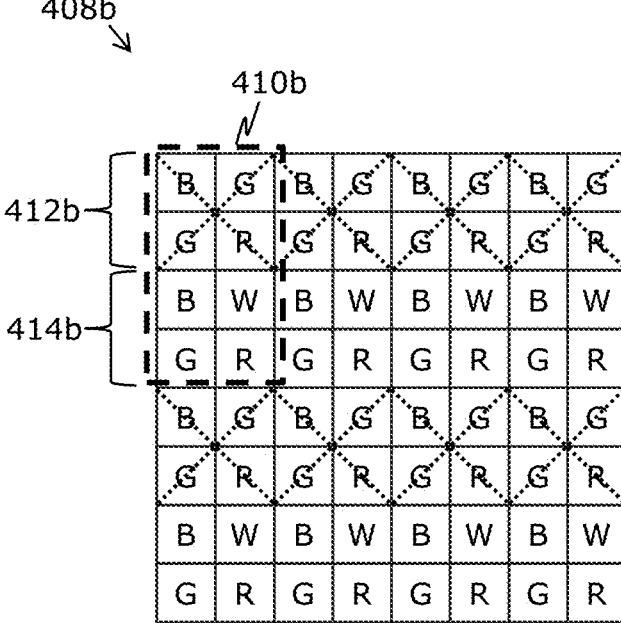

With reference to FIGS. 4D and 4E, there is shown how the image data is read out from a portion 406b of the first region 402, and from a portion 408b of the second region

404, in accordance with another embodiment of the present disclosure. For sake of simplicity and clarity, a given portion of a given region is shown to comprise 64 photosensitive cells arranged in an 8×8 grid. The term "given portion" encompasses the portion 406b and the portion 408b, and the term "given region" encompasses the first region 402 and the second region 404.

With reference to FIGS. 4D and 4E, the image sensor comprises another CFA arranged in front of photosensitive cells of the photosensitive surface 400. As shown, the another CFA comprises 8 smallest repeating units (for example, in form of a 4×2 array), wherein a given smallest repeating unit 410b (depicted as a 2×4 array of colour filters, using a dashed line box) comprises a first sub-unit 412b (depicted as a 2×2 array of colour filters) and a second sub-unit 414b (depicted as a 2×2 array of colour filters). The first sub-unit 412b comprises two green colour filters, one red colour filter, and one blue colour filter. The second sub-unit 414b comprises one blue colour filter, one green colour filter, one red colour filter, and one white or near-white colour filter.

With reference to FIG. 4D, out of 64 photo-sensitive cells, image data from 16 photo-sensitive cells (crossed out as dotted 'X's) that correspond to respective second sub-units of the 4 smallest repeating units (i.e., 50 percent of the 8 smallest repeating units) in the portion 406b of the first region 402 is not read out. In such a case, image data from 16 photo-sensitive cells that correspond to respective second sub-units of remaining 4 smallest repeating units in the portion 406b is read out. Moreover, image data from all 32 photo-sensitive cells that correspond to respective first sub-units of the 8 smallest repeating units in the portion 406b is also read out.

With reference to FIG. 4E, out of 64 photo-sensitive cells, image data from all 32 photo-sensitive cells that correspond to respective second sub-units of the 8 smallest repeating units in the portion 408b of the second region 404 is read out. Moreover, image data from all 32 photo-sensitive cells (crossed out as dotted 'X's) that correspond to respective first sub-units of the 8 smallest repeating units in the portion 408b is not read out (namely, 100 percent skipping reading out of the image data). In this case, since at least three different colours are read out using the respective second sub-units, colour information for the portion 408b of the second region 404 can still be accurately and conveniently generated.

Figure 5A:
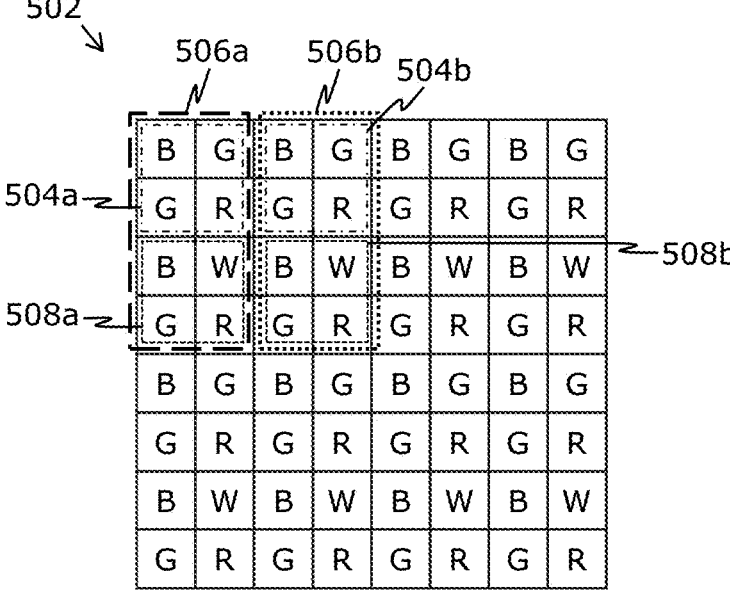
FIGS. 5A and 5B illustrate exemplary ways of how a plurality of smallest repeating units are arranged in a colour filter array, in accordance with different embodiments of the present disclosure.
Figure 5B:
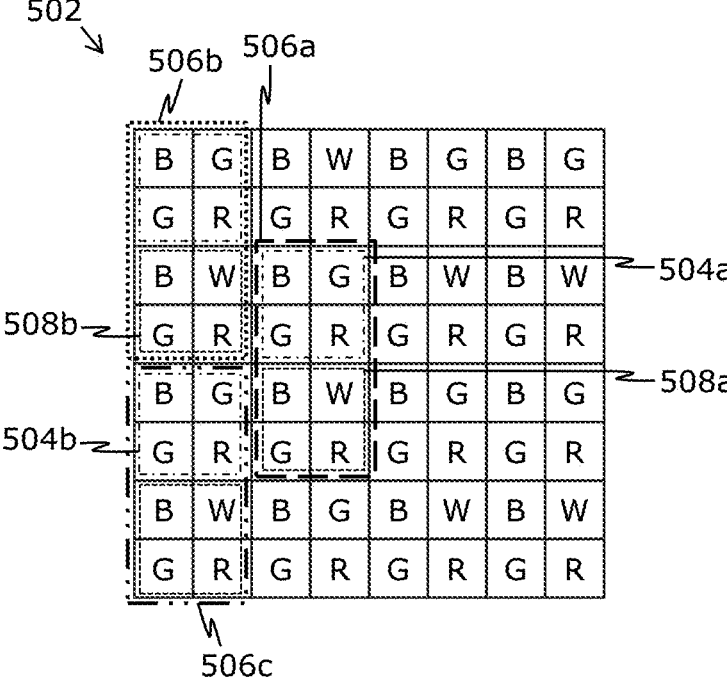

Referring to FIGS. 5A and 5B, illustrated are exemplary ways of how a plurality of smallest repeating units are arranged in a colour filter array 502, in accordance with different embodiments of the present disclosure. With reference to FIGS. 5A and 5B, "B" refers to a blue colour filter, "G" refers to a green colour filter, "R" refers to a red colour filter, and "W" refers to a white or near-white colour filter. It will be appreciated that the white or near-white colour filter allows to pass through at least three wavelengths corresponding to respective ones of at least a green colour, a red colour, and a blue colour, simultaneously. In some implementations, a cyan colour filter, a magenta colour filter, and a yellow colour filter could also be employed instead of employing the blue colour filter, the green colour filter, and the red colour filter, respectively. Moreover, an infrared colour filter could also be employed in addition to or instead of employing the white or near-white colour filter.

With reference to FIGS. 5A and 5B, for sake of simplicity and avoiding any confusion, a first sub-unit of any given smallest repeating unit is depicted as a 2×2 array of colour filters using a dash-dot line box, and a second sub-unit of any given smallest repeating unit is depicted as a 2×2 array of colour filters using a dashed line box. Moreover, any first sub-unit comprises two green colour filters, one red colour filter, and one blue colour filter; whereas any second sub-unit comprises one blue colour filter, one green colour filter, one red colour filter, and one white or near-white colour filter.

With reference to FIG. 5A, a first sub-unit 504a of a given smallest repeating unit 506a (depicted using a long-dashed line box) is horizontally adjacent to a first sub-unit 504b of another given smallest repeating unit 506b (depicted using a dotted line box), and a second sub-unit 508a of the given smallest repeating unit 506a is horizontally adjacent to a second sub-unit 508b of the another given smallest repeating unit 506b. In other words, the smallest repeating units 506a and 506b of the CFA 502 are arranged sequentially in rows and columns.

With reference to FIG. 5B, a first sub-unit 504a of a given smallest repeating unit 506a (depicted using a long-dashed line box) is horizontally adjacent to a second sub-unit 508b of another given smallest repeating unit 506b (depicted using a dotted line box), and a second sub-unit 508a of the given smallest repeating unit 506a is horizontally adjacent to a first sub-unit 504b of yet another given smallest repeating unit 506c (depicted using a dashed double dot line box). In other words, the smallest repeating units 506a, 506b, and 506c of the CFA 502 are arranged in a tiled manner.

FIGS. 4A-4E and FIGS. 5A-5B are merely examples, which should not unduly limit the scope of the claims herein. The person skilled in the art will recognize many variations, alternatives, and modifications of embodiments of the present disclosure.

The invention claimed is:

1. An imaging system comprising:
an image sensor comprising:
    a plurality of photo-sensitive cells arranged on a photo-sensitive surface of the image sensor; and
    a colour filter array comprising a plurality of smallest repeating units, wherein:
        a given smallest repeating unit comprises at least a first sub-unit and a second sub-unit,
        the first sub-unit comprises colour filters of at least three different colours,
        the second sub-unit comprises at least one other colour filter that allows to pass through at least one of: (i) at least three wavelengths corresponding to respective ones of the at least three different colours, (ii) at least one infrared wavelength; and
at least one processor configured to:
    read out image data from the image sensor, wherein when reading out, the at least one processor is configured to:
        selectively read out the image data from those photo-sensitive cells in a first region of the photo-sensitive surface that correspond to respective first sub-units of smallest repeating units in the first region; and
        selectively skip reading out from those photo-sensitive cells in a second region of the photo-sensitive surface that correspond to respective first sub-units of at least a first predefined percent of smallest repeating units in the second region; and
    process the image data to generate at least one image, wherein the at least one processor is further configured to:
        obtain information indicative of a gaze direction of a user; and determine the first region and the second region in the photo-sensitive surface of the image sensor, based on the gaze direction,
        wherein the second region surrounds the first region.

2. The imaging system of claim 1, wherein when reading out, the at least one processor is configured to:
    selectively skip reading out from those photo-sensitive cells in the first region of the photo-sensitive surface that correspond to respective second sub-units of at least a second predefined percent of the smallest repeating units in the first region; and
    selectively read out the image data from those photo-sensitive cells in the second region of the photo-sensitive surface that correspond to respective second sub-units of the smallest repeating units in the second region.

3. The imaging system of claim 1, further comprising a structured light source,
    wherein the at least one other colour filter in the second sub-unit allows the at least one infrared wavelength to pass through,
    and wherein the at least one image comprises a visible-light image and a depth image.

4. The imaging system of claim 1,
    wherein the at least one other colour filter in the second sub-unit allows the at least three wavelengths corresponding to the respective ones of the at least three different colours to pass through,
    and wherein the at least one processor is configured to:
        detect when a given criterion is satisfied, wherein the given criterion is satisfied when at least one of the following is true:
            (i) an average illuminance of a real-world environment is lower than a predefined threshold illuminance;
            (ii) a signal-to-noise ratio of the image data is lower than a predefined threshold value;
    when it is detected that the given criterion is satisfied, read out another image data from the image sensor, wherein when reading out the another image data, the at least one processor is configured to:
        selectively read out the another image data from those photo-sensitive cells that correspond to respective second sub-units of the plurality of smallest repeating units; and
        selectively skip reading out from those photo-sensitive cells that correspond to respective first sub-units of at least a third predefined percent of the plurality of smallest repeating units; and
    process the another image data to generate at least one another image.

5. The imaging system of claim 1,
    wherein the first sub-unit of the given smallest repeating unit is horizontally or vertically adjacent to a first sub-unit of another given smallest repeating unit, and
    the second sub-unit of the given smallest repeating unit is horizontally or vertically adjacent to a second sub-unit of the another given smallest repeating unit.

6. The imaging system of claim 1,
    wherein the first sub-unit of the given smallest repeating unit is horizontally adjacent to a second sub-unit of another given smallest repeating unit, and
    the second sub-unit of the given smallest repeating unit is horizontally or vertically adjacent to a first sub-unit of yet another given smallest repeating unit.

7. The imaging system of claim 1, wherein the second sub-unit further comprises colour filters of the at least three different colours.

8. A method comprising:

reading out image data from an image sensor, wherein the image sensor comprises a plurality of photo-sensitive cells arranged on a photo-sensitive surface of the image sensor, and a colour filter array comprising a plurality of smallest repeating units, wherein a given smallest repeating unit comprises at least a first sub-unit and a second sub-unit, the first sub-unit comprises colour filters of at least three different colours, the second sub-unit comprises at least one other colour filter that allows to pass through at least one of:

(i) at least three wavelengths corresponding to respective ones of the at least three different colours, (ii) at least one infrared wavelength, wherein the step of reading out the image data comprises:

selectively reading out the image data from those photo-sensitive cells in a first region of the photo-sensitive surface that correspond to respective first sub-units of smallest repeating units in the first region; and selectively skipping reading out from those photo-sensitive cells in a second region of the photo-sensitive surface that correspond to respective first sub-units of at least a first predefined percent of smallest repeating units in the second region; and processing the image data to generate at least one image, the method further comprising:

obtaining information indicative of a gaze direction of a user; and determining the first region and the second region in the photo-sensitive surface of the image sensor, based on the gaze direction, wherein the second region surrounds the first region.

9. The method of claim 8, wherein the step of reading out comprises:

selectively skipping reading out from those photo-sensitive cells in the first region of the photo-sensitive surface that correspond to respective second sub-units of at least a second predefined percent of the smallest repeating units in the first region; and selectively reading out the image data from those photo-sensitive cells in the second region of the photo-sensitive surface that correspond to respective second sub-units of the smallest repeating units in the second region.

10. The method of claim 8, wherein the at least one other colour filter in the second sub-unit allows the at least one infrared wavelength to pass through, and wherein the method further comprises illuminating a real-world environment using a structured light source, wherein the at least one image comprises a visible-light image and a depth image.

11. The method of claim 8, wherein the at least one other colour filter in the second sub-unit allows the at least three wavelengths corresponding to the respective ones of the at least three different colours to pass through, and wherein the method further comprises:

detecting when a given criterion is satisfied, wherein the given criterion is satisfied when at least one of the following is true:

(i) an average illuminance of a real-world environment is lower than a predefined threshold illuminance;

(ii) a signal-to-noise ratio of the image data is lower than a predefined threshold value;

when it is detected that the given criterion is satisfied, reading out another image data from the image sensor, wherein the step of reading out the another image data comprises:

selectively reading out the another image data from those photo-sensitive cells that correspond to respective second sub-units of the plurality of smallest repeating units; and selectively skipping reading out from those photo-sensitive cells that correspond to respective first sub-units of at least a third predefined percent of the plurality of smallest repeating units; and processing the another image data to generate at least one another image.

12. The method of claim 8, wherein the first sub-unit of the given smallest repeating unit is horizontally or vertically adjacent to a first sub-unit of another given smallest repeating unit, and the second sub-unit of the given smallest repeating unit is horizontally or vertically adjacent to a second sub-unit of the another given smallest repeating unit.

13. The method of claim 8, wherein the first sub-unit of the given smallest repeating unit is horizontally adjacent to a second sub-unit of another given smallest repeating unit, and the second sub-unit of the given smallest repeating unit is horizontally or vertically adjacent to a first sub-unit of yet another given smallest repeating repeating unit.

14. The method of claim 8, wherein the second sub-unit further comprises colour filters of the at least three different colours.

* * * * *